Jan. 24, 1961     L. B. WOLFF     2,968,867
FOOD SLICING GUIDE DEVICE
Filed Dec. 21, 1959     3 Sheets-Sheet 1
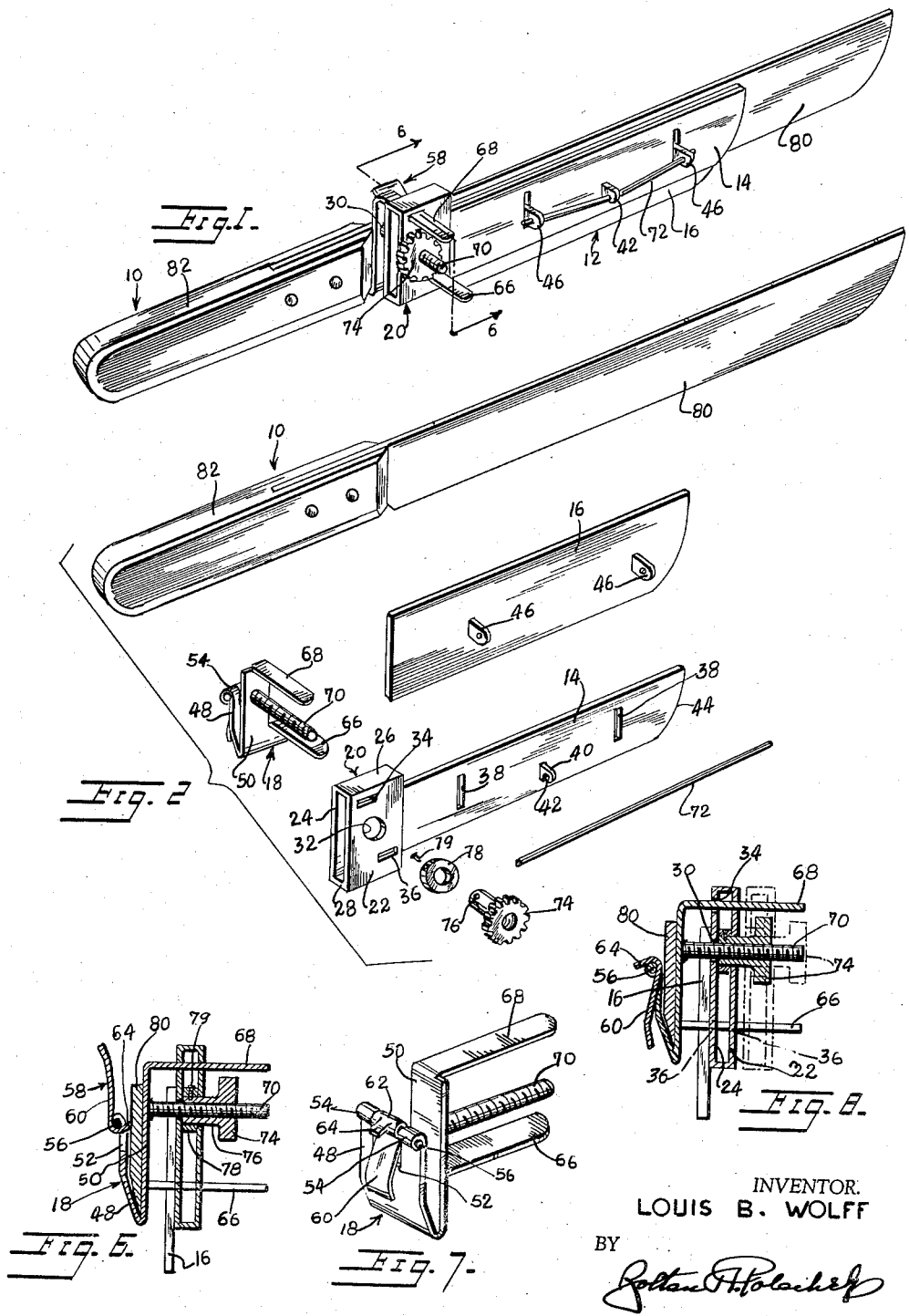
INVENTOR.
LOUIS B. WOLFF
BY
ATTORNEY

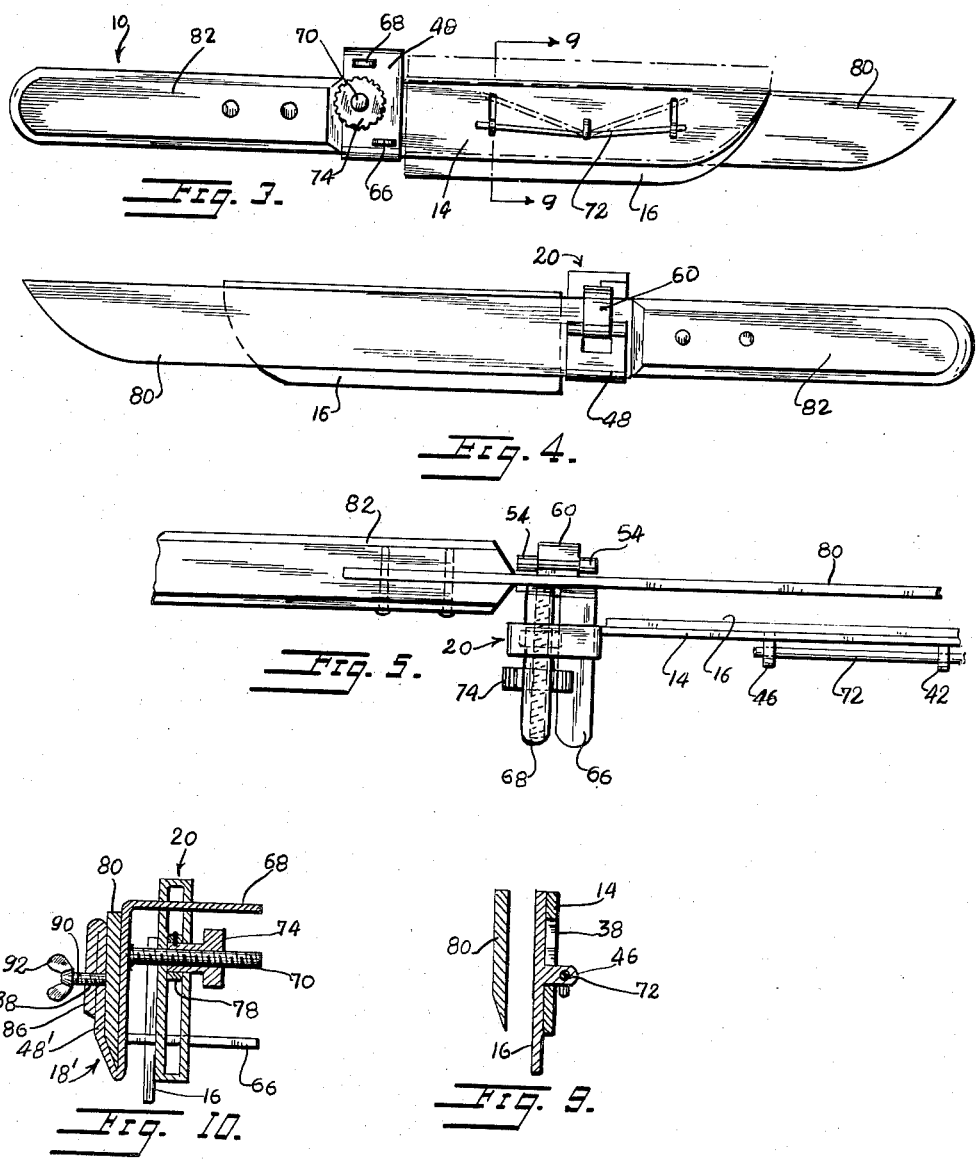

Jan. 24, 1961    L. B. WOLFF    2,968,867
FOOD SLICING GUIDE DEVICE
Filed Dec. 21, 1959    3 Sheets-Sheet 3
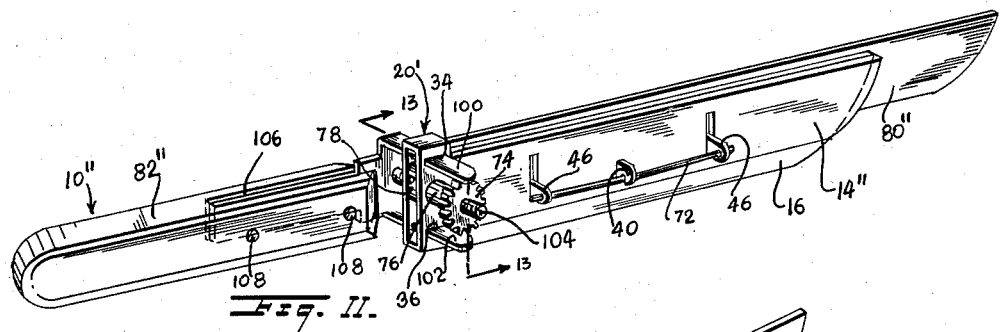
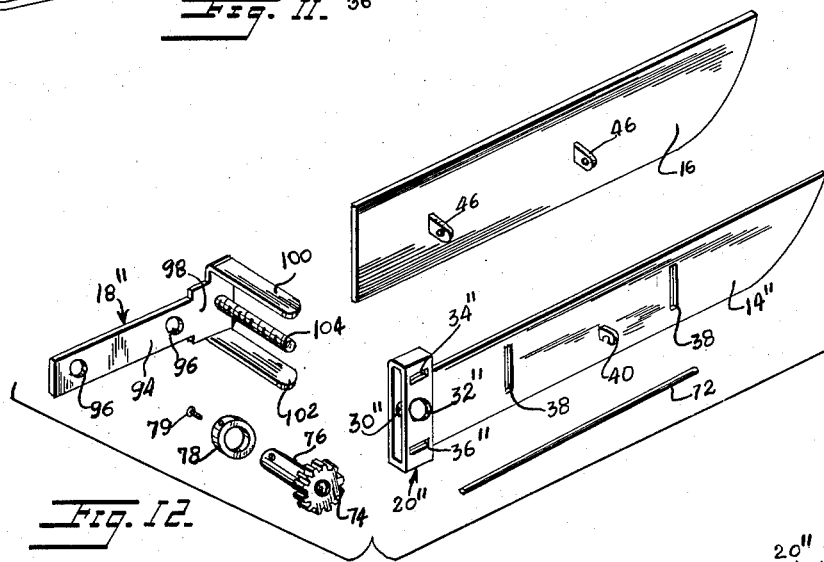
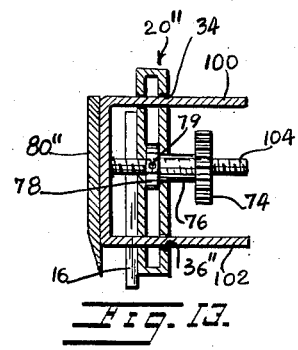
INVENTOR.
LOUIS B. WOLFF
BY
ATTORNEY United States Patent Office 2,968,867
Patented Jan. 24, 1961

2,968,867
FOOD SLICING GUIDE DEVICE
Louis B. Wolff, 272 Bradley Ave., Meriden, Conn.
Filed Dec. 21, 1959, Ser. No. 860,906
5 Claims. (Cl. 30—284)

This invention relates to food slicing guide devices and more particularly to a guide attachment for a knife for selecting the size of the slices for food to be cut.

A principal object of the present invention is to provide a device for selecting the thickness of the slice of food to be cut that constitutes a slicing guide attachment for an ordinary kitchen cutting knife.

Another object of the invention is to provide a size selecting and knife slicing guide device of this kind that is highly efficient in operation and readily assembled.

A further object of the invention is to provide a size selecting and knife slicing guide device of this kind that is sanitary, sturdy, simple in construction, economical to manufacture, and easy to keep clean.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a food-size-selecting and knife-slicing guide device embodying one form of my invention shown applied to an ordinary kitchen cutting knife.

Fig. 2 is a spread perspective view thereof.

Fig. 3 is a side elevational view of one side thereof.

Fig. 4 is a similar view of the opposite side thereof.

Fig. 5 is a fragmentary top plan view thereof.

Fig. 6 is a cross-sectional view taken on the line 6—6 of Fig. 1.

Fig. 7 is a perspective view of the clip device.

Fig. 8 is a view similar to Fig. 6 showing the knife blade in unclamped position and the spacing and guiding unit in inoperative moved position in dot-dash lines.

Fig. 9 is a cross-sectional view taken on the line 9—9 of Fig. 3.

Fig. 10 is a view similar to Fig. 6 showing a modified form of clip device.

Fig. 11 is a perspective view of a food-size-selecting and knife-slicing guide device embodying a further modified form of the invention shown applied to an ordinary kitchen cutting knife.

Fig. 12 is a spread perspective view thereof.

Fig. 13 is a cross-sectional view taken on the line 13—13 of Fig. 11.

Referring in detail to the drawings, a food-size-selecting and knife-slicing guide device embodying one form of my invention is shown in Fig. 1 applied to an ordinary kitchen cutting knife 10 and is generally indicated by the reference numeral 12. The food-size-selecting and knife-slicing-guide device consists of an elongated relatively narrow metal guide blade 14, a second elongated metal guide blade 16 slightly shorter than the blade 14 and a metal adapter device 18.

Blade 14 is formed with a rectangular-shaped box-like bearing member 20 integral therewith at one end thereof. The bearing member has a front wall 22, a rear wall 24, a top end wall 26 and a bottom end wall 28, and is open at both sides. The rear wall 24 forms a continuation of the blade 14. The rear wall 24 is formed with a central smooth-walled opening 30 and the front wall 22 is formed with a similar opening 32 but slightly larger and in alignment with the opening 30. Both front and rear walls are formed with aligned top slots 34 and with aligned bottom slots 36 offset vertically from the top slots. A pair of elongated slots 38, 38 with their long axes vertically disposed is formed in blade 14 spaced therealong. The other end of blade 14 is curved as indicated at 44 and the bottom edge of the blade is blunt. A lug 40 with a groove 42 extends outwardly of one surface of blade 14 intermediate the slots 38, 38.

The body of blade 16 is similar in construction and shape to the body of blade 14 but is slightly wider. The bottom edge of blade 16 is also blunt. When assembled, the blade 16 extends from the bearing member 20 of blade 14 to the outer free end of the blade 14 and extends from the top edge of blade 14 to a point below the bottom edge thereof, as will be seen from Fig. 1. A pair of spaced perforated lugs 46, 46 extends radially from one surface of the body of blade 16, spaced a distance corresponding to the distance between the slots 38, 38 in the body of blade 14.

Adapter 18 has a V-shaped body formed of a strip of flexible metal or plastic material, including a short leg 48 and a long leg 50. The free end of leg 48 is cut away at its center as indicated at 52 and the material of the free end is curled on both sides of the cut-away portion forming knuckles 54, 54 which form bearings for the ends of a pivot pin 56. A metal clamping device 58 is pivotally mounted on the pin 56 at the cutout portion of leg 48. The clamping device consists of a plate 60 having a slightly curved body curled at one end and sleeved around the pin 56 as indicated at 62. A short lug 64 projects readially and outwardly of the sleeve 62 and away from the legs 48 and 50.

The material of leg 50 of adapter 18 is slitted longitudinally and inwardly of one long edge thereof and downwardly to a point remote from the bottom end of the leg and at right angles to the leg in a direction opposite to the direction of extension of lug 64 thereby forming a lower track 66. At the free end of the leg 50, the material intermediate the long edges thereof is bent at right angles, in the same direction as track 66, forming an upper track 68 offset slightly vertically from the lower track 66. Bath tracks extend outwardly in the same distance. A rod 70 having external screw threads therealong is secured by welding or the like at one end of the leg 50 between the tracks 66 and 68, projects in the same direction as the tracks and is of the same length as the tracks. The tracks 66 and 68 are offset vertically and horizontally corresponding to the vertical and horizontal arrangement of the upper slots 34, 34 and lower 36, 36 in the bearing member 20 of blade 14. The spacing of the threaded rod 70 from the tracks corresponds to the spacing of the aligned holes 30 and 32 in the rear and front walls respectively of the bearing member 20 of blade 14.

In assembling the food-size-selecting and knife-slicing guide device 12, the blade 16 is placed in juxtaposition alongside blade 14 with its perforated lugs 46, 46 extending through the slots 38, 38 of blade 14. The blades are held in this relationship by a piano wire 72 extending through the groove 42 in lug 40 on blade 14 and which has its ends anchored in lugs 46, 46 on blade 16. The adapter 18 may next be releasably interlocked with the inner end of the blade 14 by inserting tracks 66 and 68 through the aligned slots 34, 34 and 36, 36 of bearing member 20 of blade 14. At the same time, the threaded rod 70 is inserted through the aligned openings 30 and 32 in the front and rear walls of the bearing member. This arrangement permits sliding movement of the combined unit, consisting of blades 14 and 16, along the tracks 66 and 68. The slots 38, 38 on blade 14 are longer than the height of the lugs 46, 46 on blade 16 so that blade 16 is permitted to move up and down relative to blade 14.

An actuating nut member 74 having an elongated hub portion 76 is threaded onto the free end of threaded rod 70 with its hub portion extending through the opening 32 in front wall 22 of the bearing member 20 of blade 14 and extending through a collar 78 disposed between the walls of the bearing member and secured to the hub portion of the nut member by a setscrew 79.

The hub portion 76 extends loosely through the opening 32 in the front wall and engages the rear wall 24, the inner end of the hub portion being larger in diameter than the opening in the rear wall. The rod 70 also loosely extends through the opening in the rear wall so that the bearing member is adapted to slide on the adapter 18. By turning the nut member 74 clockwise looking from the top of Fig. 5, the bearing member carrying blades 14 and 16 is slid inwardly along the tracks 66 and 68, and by turning the nut member counter-clockwise the collar 78 will engage the front wall 22 of the bearing member 20 and slide the bearing member carrying the blades outwardly along the tracks 66 and 68.

In applying the food-size-selecting and knife-slicing guide attachment 12 to the blade 80 of the knife 10, the blade is inserted through the adapter 18 between the legs 48 and 50 so as to dispose the knife blade alongside but spaced from the blade 16 and to dispose the adapter adjacent the handle 82 of the knife 10. The clamping device 58 is then swung upwardly bringing the lug 64 into clamping engagement with the knife blade 80 thereby clamping the adapter to the knife blade. The blade 16 is normally positioned so that its blunt edge protrudes slightly below the knife blade 80 and below the outer blade 14, the studs 46, 46 being positioned in the bottom ends of the slots 38, 38 as shown in Fig. 1.

When it is desired to cut a slice of food such as a block of cheese, meat and the like, of predetermined thickness, the unit including the blades 14 and 16 is adjusted relative to the knife blade 80 by turning the nut member 74 in the proper direction whereupon the unit slides away from the blade 80, along the tracks 66 and 68 the desired distance. The knife 10 is grasped by the handle 82 and the downwardly extending blunt edge of the blade 16 is placed alongside the side of the article of food to be cut whereupon the knife blade 80 will be positioned the proper distance inwardly of the side of the article of food for guided cutting of the food.

In cutting the food, downward pressure is brought to bear upon the knife blade 80 and the attachment 12 guides the cutting operation. When the protruding edge of blade 16 meets resistance from the food-supporting surface, continued downward pressure will cause the lugs 46, 46 on blade 16 to ride upwardly in the slots 38, 38 in blade 14 permitting the knife blade 80 to move downwardly to finish the cutting operation. At the same time, the lug 40 on blade 14 is riding downwardly carrying the center of the wire 72 therealong thereby flexing the wire and upon release of downward pressure, the wire 72 retracts the blade 16 to lower normal position.

In Fig. 10, a modified form of adapter 18′ is shown. This adapter 18′ differs from adapter 18 in that instead of a pivoted clamp such as the clamp 58, the leg 48′ is turned upon itself as indicated at 86 forming a two-ply leg, with aligned threaded openings 88 extending through both plies. A screw 90 having a wing-shaped finger piece 92 is threaded through the aligned openings and clamps the knife blade 80 against the leg 50 of the adapter.

Referring now to the modification of the invention shown in Figs. 11 to 13, inclusive, herein the bearing member 20″ on the blade 14″ differs from the bearing member 20 in that the upper and lower slots 34″ and 36″, respectively, are in vertical alignment with each other and with the aligned holes 30″ and 32″ in the rear and front walls, respectively, of the bearing member, instead of being offset vertically.

A modified form of adapter 18″ is also used in this modification. Adapter 18″ comprises an elongated rectangular-shaped plate-like body 94 formed with spaced holes 96 therealong. At one end the body terminates in an enlargement or head 98. The material of the head along one long edge thereof at its outer extremity is bent upon itself and extended at right angles to the head providing an upper track 100, and along the other long edge is bent upon itself and extending in the same direction as track 100 providing a lower track 102 as viewed in Fig. 11 and Fig. 12. The tracks are disposed one above the other in the same vertical plane to correspond with the disposition of the slots 34″ and 36″ of the bearing member 20″. A screw-threaded rod 104 has one end welded or otherwise secured to the head 98 midway between the tracks 100 and 102 and extending in the same direction as the tracks. The tracks and rod are all of the same length.

The adapter 18″ in this form is permanently fixed in the handle 82″ of the knife 10″ by mounting the body portion 94 alongside the shank 106 of the knife blade 80″ and securing the body portion to the shank and handle by means of rivets 108, the head portion 98 extending outwardly of the handle and along the blade 80″.

In all other respects the modification shown in Figs. 11 to 13, inclusive, is similar to the form of Figs. 1 to 9, inclusive, and similar reference numerals are used to indicate similar parts.

The size-spacing and knife-slicing guide unit including the blades 14″ and 16″ is applied to the adapter 18″, is actuated and is operated in a manner similar to the form of Figs. 1 to 9, inclusive.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A food selecting and slicing guide attachment comprising, in combination with a knife blade, an elongated narrow guide blade, another elongated guide blade in juxtaposed relation to said first-named blade, said first-named blade having a pair of spaced vertically disposed slots therealong, a box-like bearing member on one end of the first-named guide blade, said bearing member having spaced front and rear walls with aligned upper and lower slots therein and with central aligned openings, a grooved lug extending from one surface of said first-named blade, said second-named blade having a pair of spaced perforated lugs extending radially from one surface thereof, the spacing of said latter lugs corresponding to the spacing of the slots of the pair of vertically disposed slots in the first-named blade, the lugs on said second-named blade extending through said latter slots in the first-named blade, a wire extending through the groove in the lug on the first-named blade and having its ends anchored in the perforations in the lugs on the second-named blade for holding the blades juxtaposed, and a V-shaped adapter carried on the end of the first-named blade, said adapter having laterally protruding spaced offset tracks extending through the pair of vertically disposed slots in the bearing member, and means for moving the juxtaposed guide blades as a unit toward and away from the knife blade.

2. A food selecting and slicing guide attachment comprising, in combination with a knife blade, an elongated narrow guide blade, another elongated guide blade in juxtaposed relation to said first-named blade, said first-named blade having a pair of spaced vertically disposed slots therealong, a box-like bearing member on one end of the first-named guide blade, said bearing member having spaced front and rear walls with aligned upper and lower slots therein, and with central aligned openings, a grooved lug extending from one surface of said first-named blade, said second-named blade having a pair of spaced perforated lugs extending radially from one surface thereof, the spacing of said latter lugs corresponding to the spacing of the slots of the pair of vertically disposed slots in the first-named blade, the lugs on said second-named blade extending through said latter slots in the first-named blade, a wire extending through the groove in the lug on the first-named blade and having its ends anchored in the perforations in the lugs on the second-named blade for holding the blades juxtaposed, and a V-shaped adapter carried on the end of the first-named blade, said adapter having laterally protruding spaced offset tracks extending through the pair of horizontally and vertically disposed slots in the bearing member, a screw-threaded rod on the adapter extending outwardly between the tracks and through the aligned openings in the bearing member, and means for moving the juxtaposed blades as a unit toward and away from the knife blade, including a nut having an elongated hub portion threaded on said threaded rod and engaging said bearing member.

3. A food size-selecting and slicing guide attachment for a kitchen cutting knife having an elongated blade, said attachment comprising a V-shaped sheet metal adapter having means for clamping the adapter to the knife blade, a pair of juxtaposed guide blades, means for holding the blades in juxtaposition as a unit, one of said blades being wider than the other and having one edge normally projecting below the adjacent edge of the other blade, means to allow movement of said wider blade relative to the other blade, means for movably interlocking the blades as a unit to the adapter, and means for moving the blades as a unit toward and away from the blade of the knife.

4. A food size-selecting and slicing guide attachment for a kitchen knife having an elongated blade as defined in claim 3, wherein the means for moving the wider blade relative to the narrow blade is constituted by a pair of elongated vertically disposed spaced slots in the narrow blade, a pair of corresponding spaced lugs on the wide blade extending through the slots, said slots being longer than the width of the lugs whereby said lugs are adapted to be moved manually lengthwise of the slots, said lugs having perforations, a grooved lug carried by the narrow blade and a wire threaded through said groove and having its ends anchored in the perforations in said lugs for retracting said wider blade after manual movement thereof in one direction.

5. A food size-selecting and slicing guide attachment for a kitchen cutting knife having an elongated blade as defined in claim 6, wherein the means for interlocking the blades as a unit to the adapter is constituted by outwardly extending spaced tracks on the adapter, said tracks being offset horizontally and vertically from each other, said narrow blade having a bearing member with a pair of spaced elongated slots offset horizontally and vertically corresponding to the offset arrangement of the tracks, said tracks extending loosely through the slots in the bearing member of the narrow blade.

References Cited in the file of this patent

UNITED STATES PATENTS

| | | |
|---|---|---|
| 46,224 | Dow | Feb. 7, 1865 |
| 1,069,189 | Saltzman | Aug. 5, 1913 |
| 2,326,563 | Rezos | Aug. 10, 1943 |